Patented June 26, 1934

1,964,309

UNITED STATES PATENT OFFICE 1,964,309

SULPHUR DYESTUFF PREPARATION

Hermann Berthold, Leverkusen-I. G.-Werk, Germany, assignor to General Aniline Works, Inc., New York, N. Y., a corporation of Delaware No Drawing. Original application November 18, 1930, Serial No. 496,558. Divided and this application December 13, 1933, Serial No. 702,262. In Germany November 19, 1929

18 Claims. (Cl. 8—6)

The present invention relates to new sulphur dyestuff preparations suitable for printing purposes, to a process of printing textile fibres with these preparations and to the printed fabrics obtainable by the application of said dyestuff preparations.

In accordance with the invention hydroxy anthraquinones or substitution products thereof, or also reduction products of these substances, which still contain oxygen in the ms-position or mixtures of compounds of these types are employed to influence favorably the capacity for printing of sulphur dyestuffs, that is, to improve the strength of the printings obtainable and at the same time the speed of fixation.

The further addition of anthraquinone or reduction products thereof containing oxygen enhances the efficacy of the first mentioned products in many cases.

The hydroxyanthraquinones, and also the anthraquinone or the reduction products of these substances are preferably applied in a finely divided state for the purposes of the present process. This may be accomplished in a variety of ways. Thus, for example, the substances in question may be finely ground or they may be dissolved in sulphuric acid and reprecipitated with water or, in so far as they are soluble in alkali, they may be dissolved in caustic alkalies, for example, in aqueous caustic soda solution and reprecipitated with mineral acids. Finally, they may be reduced, wholly or in part, if desired in the presence of glycerine or other similar polyvalent alcohols soluble in water, and thus be obtained in a condition which does not lead to deposition. This method of working shows technical advantages in so far as expenses are obviated in respect of milling, drying or dissolving in sulphuric acid and precipitation therefrom, as well as washing until neutral, and furthermore in so far as this process can be combined with that of the manufacture of the dyestuff preparations to one step of working.

The incorporating of the hydroxy anthraquinones or their reduction products containing oxygen in the ms-position within the dyestuffs may be accomplished in a variety of ways. For example, the different constituents may be mixed in the dry state or in form of aqueous pastes; or, the hydroxy anthraquinones etc. may be added to the printing colors at any stage of their manufacture. The best results generally are obtained when adding the hydroxy anthraquinones to aqueous pastes of the dyestuffs containing glycerine or another similar polyvalent water-soluble alcohol, such as glycol, thiodiglycol, thiodiglycerol and the like. The pastes thus obtainable are very stable, do not deposit or dry up, do not form crusts and can be applied for printing purposes even after prolonged storing. In some cases it will be of advantage to work in the following manner:

The dyestuff is suspended in water, glycerine or another watersoluble alcohol as mentioned above is added and the dyestuff reduced in this suspension by means of a reducing agent customarily employed in dyeing with sulphur dyestuffs and in the presence of an alkali, such as caustic soda solution, caustic potash solution or preferably a weaker alkali, such as ammonia, sodium carbonate, potassium carbonate or the like. As reducing agents alkali metal hydrosulphites etc. will be suitable ones. A hydroxy anthraquinone or a reduction product thereof containing oxygen in the ms-position is added to the preparations above mentioned at any desired stage of their manufacture. The dyestuff pastes thus obtainable containing the dyestuff in a reduced form (in the case of applying a rather weak alkali, such as ammonia, soda or potash, probably in the form of the free leuco acid) likewise do not deposit, do not congeal, do not form crusts, and for printing purposes possess advantages similar to the preparations mentioned before.

In addition to the hydroxy anthraquinones and/or their reduction products above specified, anthraquinone or its reduction product containing oxygen and/or so-called hydrotropically acting agents may be added. Under the term "hydrotropically acting agents" I understand compounds promoting the solubility of water insoluble or difficultly soluble substances in water (compare Neuberg, Biochemische Zeitschrift vol. 76, (1916), page 107 ff.; Tamba, Biochemische Zeitschrift, vol. 145, (1924), page 415 ff.; Neuberg, Sitzungsberichte der königl. preuss. Akademie der Wiss. 1916). Suitable hydrotropically acting agents are for example: urea or the alkali metal salts (including ammonium salts) of the following acids: benzoic acid, salicylic acid, the benzene sulphonic acids, naphthalene sulphonic acids, aniline sulphonic acids and substitution products thereof, such as for example, dimethylmetanilic acid, alkali metal salts of hydroaromatic carboxylic and sulphonic acids, as for example, tetrahydronaphthalene-β-sulphonic acid and the like.

It may be mentioned that the hydrotropically acting agent to be used in a particular case will depend on the nature of the dyestuff to be printed as well as on the printing method applied.

Instead of the pure hydroxy anthraquinones mixtures of the same can be applied, for example, the technical mixture of 2.6- and 2.7-dihydroxyanthraquinone, or substituted hydroxy anthraquinones, such as halogenated hydroxy anthraquinones, aminohydroxyanthraquinones and the like.

For printing purposes the preparations described above are worked up to printing colors in any desired manner. For example, the dry preparations may be made up to aqueous pastes suitably in the presence of glycerine, ethylene glycol or another similar polyvalent watersoluble alcohol, a thickening of any desired composition is added, furthermore caustic soda solution and sodium hydrosulphite, and the mixture heated to 60° C., until the dyestuff has dissolved in the form of its leuco derivative. After cooling, sodium formaldehydesulphoxylate and potassium carbonate are stirred into the mixture. Cotton or another suitable textile product is printed with this printing color, the printings are steamed, for example, in a Mather-Platt apparatus and developed by a treatment with suitable oxidizing agents, such as oxygen (air), potassium bichromate and acetic acid and the like. Finally the printings are soaped while boiling.

Another method of printing with my preparations will be as follows:

The powdery preparations are made up to an aqueous paste, a thickening, glycerine, potassium carbonate and sodium formaldehydeoxylate are added and textile products are printed with these printing colors containing the dyestuff in the unreduced state. The printings are steamed, whereby reduction of the dyestuff occurs, and further treated as described above. Instead of the powdery preparations the aqueous pastes thereof, which may contain glycerine, ethylene glycol, thiodiglycol etc. may be applied, whereby in case the pastes contain glycerine etc. a further addition of the latter when preparing the printing colors will be unnecessary, in many cases, but necessary in other cases, mainly depending on the type of dyestuff applied. According to this process also, my dyestuff preparations, obtained by reducing the dyestuffs in the presence of water, glycerine and an alkali, preferably one which is weaker than caustic alkali solutions, such as ammonia, sodium carbonate, potassium carbonate etc., may be worked up to printing colors and applied for printing purposes. It may be mentioned that in this case also the addition of a suitable reducing agent, such as sodium formaldehyde sulphoxylate and, of an alkali and in most cases, of glycerine, thiodiglycol, or the like, to the printing color, will be necessary or, at least advantageous, in order to obtain the best results.

The following examples illustrate the invention without limiting it thereto:

*Example 1*

400 grams of 2-hydroxyanthraquinone are made into a paste with 800 grams of glycerine and 3000 grams of water and reduced at 70° C. by means of 800 grams of aqueous ammonia (25%) and 160 grams of sodium hydrosulphite, whereby a mixture of finely divided 2-hydroxyanthraquinone and reduction products of the same is formed. The mixture is evaporated on the water bath until it contains about 25% of 2-hydroxyanthraquinone or reduction products thereof.

*Example 2*

A. 100 grams of Hydronblue R (compare Colour Index 1924, page 236, No. 969) in the form of a press cake (40%) and 10 grams of anthraflavic acid (finely ground) are introduced into 180 grams of crude glycerine. 50 grams of sodium tetrahydronaphthalene-β-sulphonate are added, and if desired, small quantities of a fungicidal agent; the paste is made up with water to a dyestuff content of 16% and passed through a fine meshed sieve.

B. From the preparation of A a printing paste is prepared in the following manner:

3 grams of preparation A and
4 grams of glycerine are made into a paste with
29.5 grams of hot water. To this paste are added
4 grams of grape sugar
2.5 grams of calcined sodium carbonate
3 grams of sodium benzylsulphanilate and
4 grams of sodium formaldehyde sulphoxylate 1:1.

The paste is heated to 60° C. for a quarter of an hour and 50 grams of a thickening are added containing in 1000 grams 130 grams of wheat starch
520 grams of water
350 grams of gum tragacanth (65:1000).

This preparation is applied for printing purposes in the usual manner.

*Example 3*

40 grams of the dyestuff of Example 2, in the form of a press cake, are reduced with
10 grams of sodium hydrosulphite at a temperature of 70° C. in the presence of
80 grams of crude glycerine
4 grams of anthraflavic acid and
50 grams of aqueous ammonia 25%;
20 grams of sodium tetrahydronaphthalene-β-sulphonate are added and the mixture is evaporated to a dyestuff content of 19%. Printings obtained with this paste according to Example 2 B are stronger and better fixed than printings obtainable by working up an aqueous paste of the same dyestuff to printing pastes in the usual manner and printing with the latter. In this example the anthraflavic acid may be replaced, for example, by 2-hydroxyanthraquinone, and the sodium tetrahydronaphthalene-β-sulphonate by other hydrotropically acting agents, such as the sodium salts of dimethylmetanilic acid, dimethylsulphanilic acid, benzoic acid, salicylic acid, cresotinic acid and the like. Also without the application of a hydrotropically acting agent good results are obtainable.

*Example 4*

A. 40 grams of Indocarbon CL (powder) (compare Schultz, Farbstofftabellen 1931, 7th edition, vol. I, No. 1114) are introduced into 80 grams of crude glycerine, 4 grams of anthraflavic acid and 10 grams of sodium benzene sulphonate are added and the mixture is made up with water to a dyestuff content of 24% and passed through a finely meshed sieve.

B. For printing purposes a printing color is prepared from this preparation by mixing:

25 grams of the 24% preparation A,
6 grams of glycerine, 10 grams of aqueous caustic soda lye of 33% strength,
3 grams of calcined potassium carbonate,
10 grams of grape sugar,
3 grams of sodium formaldehyde sulphoxylate,
40 grams of a thickening, containing in 1000 grams:
- 130 grams of wheat starch,
- 250 grams of British gum powder,
- 600 grams of water,
- 20 grams of sodium benzylsulphanilate.

The printing color thus obtained yields on cotton a powerful and well fixed deep black. By applying less of the dyestuff, grey prints are obtained which fix better and yield stronger and more even prints than by applying the Indocarbon CL for printing purposes in the usual manner.

*Example 5*

40 grams of Indocarbon CL (20% aqueous paste) are reduced with 16 grams of sodium hydrosulphite in the presence of 80 grams of crude glycerine, 4 grams of anthraflavic acid and 100 grams of aqueous ammonia 25%. If desired, 20 grams of sodium benzene sulphonate may be added and the mixture evaporated to a dyestuff content of 20%. The paste thus obtained is stable and may be applied for printing purposes, after working up to a printing color in the usual manner, with the effect of yielding on cotton very powerful well-fixed and even grey to black shades.

This application is a divisional application of my co-pending application Ser. No. 496,558, filed November 18, 1930.

I claim:

1. A sulphur dyestuff printing preparation comprising a hydrotropically acting agent and a compound of the group consisting of hydroxyanthraquinones, which may be substituted in the nucleus by halogen atoms or amino groups, and such reduction products of these compounds as still contain oxygen in the meso-position.

2. A sulphur dyestuff printing paste comprising a compound of the group consisting of glycerine and similar watersoluble polyvalent alcohols and a compound of the group consisting of hydroxyanthraquinones, which may be substituted in the nucleus by halogen atoms or amino groups, and such reduction products of these compounds as still contain oxygen in the meso-position.

3. A dyestuff printing paste comprising an unreduced sulphur dyestuff, glycerine and a compound of the group consisting of hydroxyanthraquinones, which may be substituted in the nucleus by halogen atoms or amino groups, and such reduction products of these compounds as still contain oxygen in the meso-position.

4. A dyestuff printing paste comprising an unreduced sulphur dyestuff, glycerine and a compound of the formula:

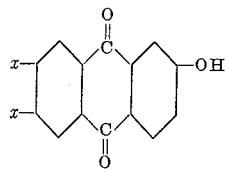

wherein one $x$ means hydrogen and the other $x$ stands for hydrogen or for the hydroxy group.

5. A dyestuff printing paste comprising an unreduced sulphur dyestuff, glycerine and anthraflavic acid.

6. A dyestuff printing paste comprising a reduced sulphur dyestuff, glycerine and a compound of the formula:

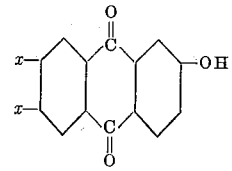

wherein one $x$ means hydrogen and the other $x$ stands for hydrogen or for the hydroxy group.

7. A dyestuff printing paste comprising a reduced sulphur dyestuff, glycerine and anthraflavic acid.

8. A sulphur dyestuff printing paste comprising a compound of the group consisting of glycerine and similar watersoluble polyvalent alcohols, a hydrotropically acting agent and a compound of the group consisting of hydroxyanthraquinones, which may be substituted in the nucleus by halogen atoms or amino groups and such reduction products of these compounds, as still contain oxygen in the meso-position.

9. A dyestuff printing paste comprising an unreduced sulphur dyestuff, glycerine, a hydrotropically acting agent and a compound of the group consisting of hydroxyanthraquinones, which may be substituted in the nucleus by halogen atoms or amino groups, and such reduction products of these compounds as still contain oxygen in the meso-position.

10. A dyestuff printing paste comprising an unreduced sulphur dyestuff, glycerine, a hydrotropically acting agent and a compound of the formula:

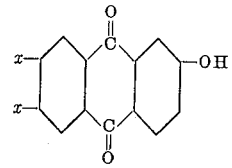

wherein one $x$ means hydrogen and the other $x$ stands for hydrogen or for the hydroxy group.

11. A dyestuff printing paste comprising an unreduced sulphur dyestuff, glycerine, a hydrotropically acting agent and anthraflavic acid.

12. A dyestuff printing paste comprising a reduced sulphur dyestuff, glycerine, a hydrotropically acting agent and a compound of the formula:

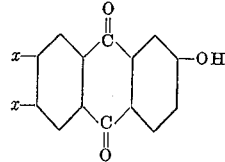

wherein one $x$ means hydrogen and the other $x$ stands for hydrogen or for the hydroxy group.

13. A dyestuff printing paste comprising a reduced sulphur dyestuff, glycerine, a hydrotropically acting agent and anthraflavic acid.

14. The process which comprises printing textile fibres with a printing paste derived from a sulphur dyestuff, said paste comprising a compound of the group consisting of hydroxyanthraquinones, which may be substituted in the nucleus by halogen atoms or amino groups, and such reduction products of these compounds as still contain oxygen in the meso-position.

15. The process which comprises printing cotton with a printing paste derived from a sulphur dyestuff, said paste comprising a compound of the formula:

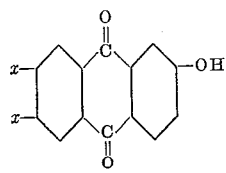

wherein one $x$ means hydrogen and the other $x$ stands for hydrogen or for the hydroxy group.

16. The process which comprises printing cotton with a printing paste derived from a sulphur dyestuff, said paste containing anthraflavic acid.

17. A dyestuff printing preparation comprising Hydronblue R and anthraflavic acid.

18. A dyestuff printing preparation comprising Indocarbon CL, anthraflavic acid and glycerine.

HERMANN BERTHOLD.